(12) United States Patent
Ishida et al.

(10) Patent No.: US 12,456,310 B2
(45) Date of Patent: Oct. 28, 2025

(54) INFORMATION PROCESSING DEVICE, INFORMATION PROCESSING SYSTEM, AND INFORMATION PROCESSING METHOD

(71) Applicant: HONDA MOTOR CO., LTD., Tokyo (JP)

(72) Inventors: Yusuke Ishida, Tokyo (JP); Junichiro Onaka, Tokyo (JP); Junya Obara, Tokyo (JP); Kenta Maruyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 149 days.

(21) Appl. No.: 18/244,921

(22) Filed: Sep. 12, 2023

(65) Prior Publication Data

US 2024/0087339 A1    Mar. 14, 2024

(30) Foreign Application Priority Data

Sep. 14, 2022    (JP) .................................. 2022-146095

(51) Int. Cl.
*G06V 20/59*    (2022.01)
*G06F 3/14*    (2006.01)
(Continued)

(52) U.S. Cl.
CPC ................ *G06V 20/59* (2022.01); *G06F 3/14* (2013.01); *G06F 3/16* (2013.01); *G06T 7/0002* (2013.01);
(Continued)

(58) Field of Classification Search
CPC ...... G06V 20/59; G06V 40/161; G06V 40/28; G06V 20/593; G06V 20/597; G06F 3/14;
(Continued)

(56) References Cited

U.S. PATENT DOCUMENTS 10,723,267 B2 *    7/2020    Kothari ................... B60R 1/008
10,977,865 B2 *    4/2021    Yasrebi ................... G06F 3/011
(Continued)

FOREIGN PATENT DOCUMENTS

JP    2020-080542    5/2020

OTHER PUBLICATIONS

Japanese Office Action for Japanese Patent Application No. 2022-146095 dated Jun. 4, 2024.

*Primary Examiner* — Fernando Alcon
(74) *Attorney, Agent, or Firm* — Amin, Turocy & Watson, LLP

(57) ABSTRACT

An information processing device mounted in a moving object includes a display device having a display display a person image indicating a person or a character corresponding to the person and capable of adjusting a position of the display so that an occupant of a backseat is shown in a mirror when an occupant of a driver's seat or a front passenger seat of the moving object visually recognizes the display on the assumption that the display is the mirror and the occupant is sitting in the backseat of the moving object and a control device control a first speaker within the moving object so that a sound is output from a direction of the backseat when the display is allowed to display a service image including the person image in which the person or the character is sitting in the backseat of the moving object.

19 Claims, 11 Drawing Sheets

(51) Int. Cl.
   *G06F 3/16*     (2006.01)
   *G06T 7/00*     (2017.01)
   *G06T 7/70*     (2017.01)
   *H04R 1/00*     (2006.01)

(52) U.S. Cl.
   CPC ............. *G06T 7/70* (2017.01); *H04R 1/00*
      (2013.01); *G06T 2207/30168* (2013.01)

(58) Field of Classification Search
   CPC ......... G06F 3/16; G06F 3/165; G06T 7/0002;
      G06T 7/70; G06T 2207/30168; H04R
      1/00; H04R 2499/13; G09G 2340/10;
      G09G 2380/10; G09G 5/377; H04S
      7/303; H04S 2400/11; B60R 1/26; B60R
      1/29; G01C 21/005; G01C 21/3446;
      G01C 21/3629; G01C 21/3641
   See application file for complete search history.

(56)              References Cited

U.S. PATENT DOCUMENTS

| 2017/0013188 | A1* | 1/2017  | Kothari          | H04N 23/62  |
| 2017/0313248 | A1* | 11/2017 | Kothari          | B60K 35/10  |
| 2018/0091922 | A1* | 3/2018  | Satongar         | G06F 3/012  |
| 2018/0369702 | A1* | 12/2018 | Hake             | A63G 25/00  |
| 2019/0355178 | A1  | 11/2019 | Hermina Martinez et al. | |
| 2020/0258306 | A1* | 8/2020  | Forutanpour      | G01S 5/0072 |
| 2024/0112677 | A1* | 4/2024  | Mayer            | A61B 5/6893 |

\* cited by examiner

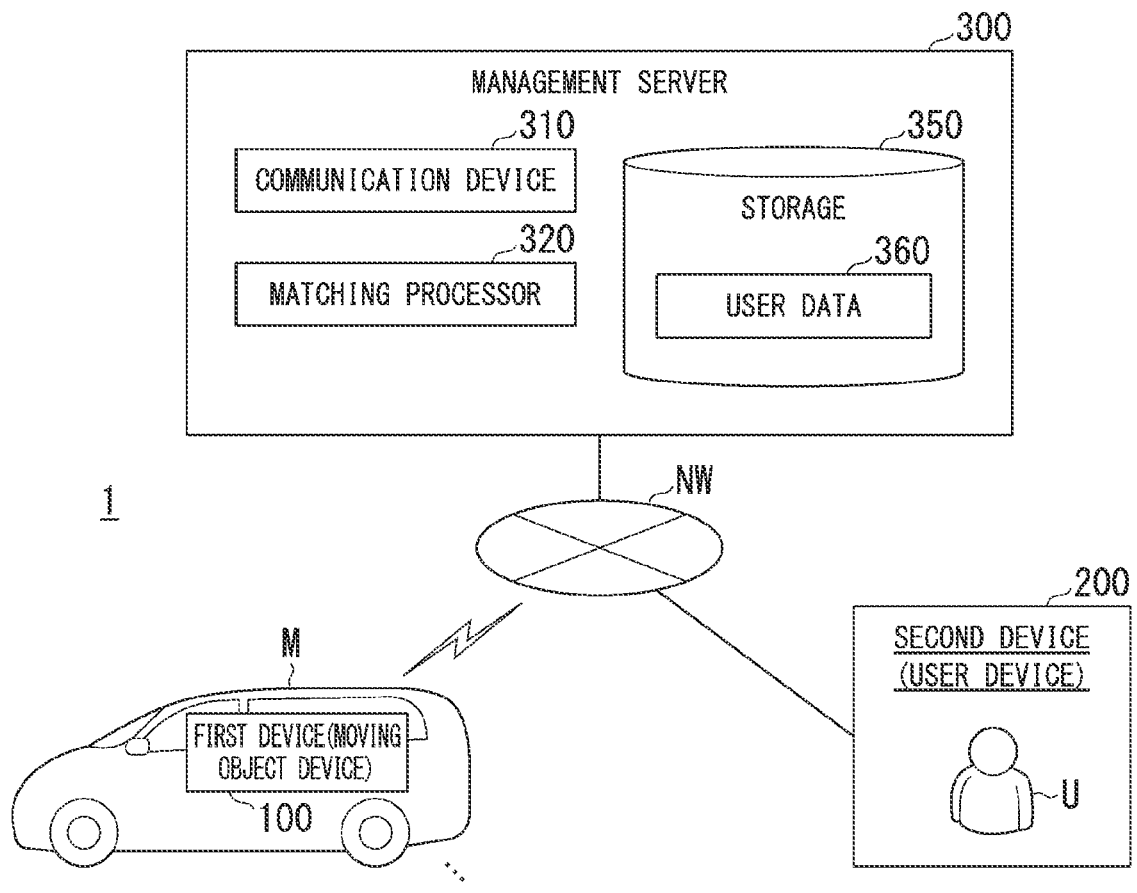

FIG. 10
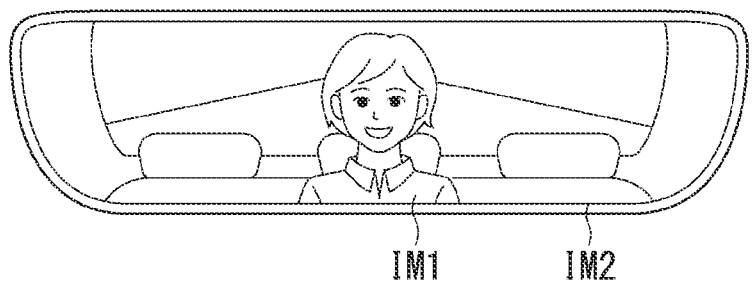
FIG. 11
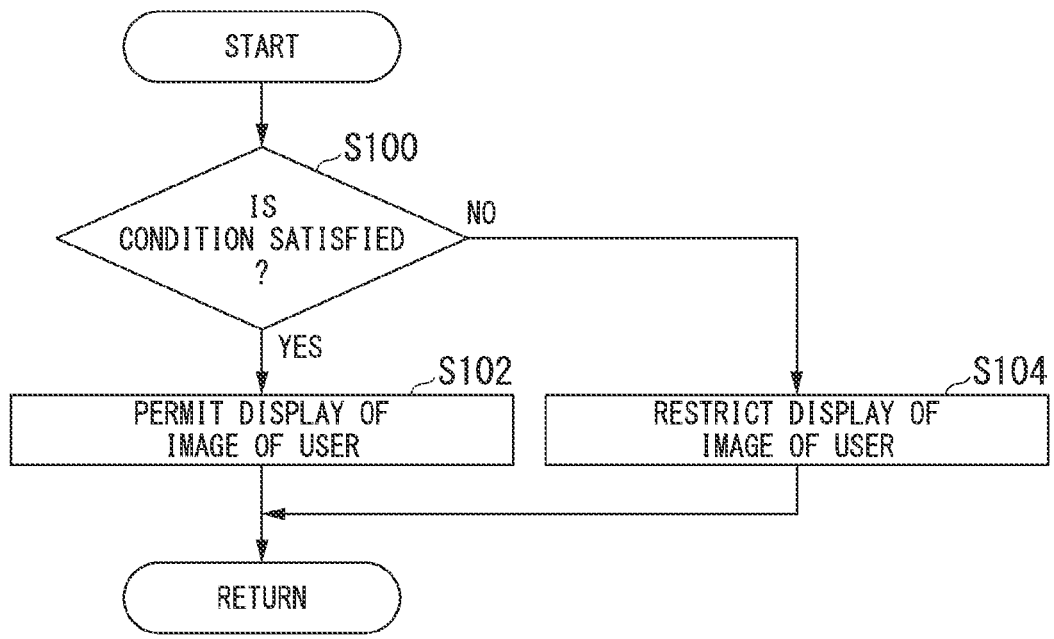
FIG. 12
| CONDITION |
|---|
| STOPPED |
| PARKING POSITION |
| CONTROL ACCORDING TO DRIVING ASSISTANCE OR AUTOMATED DRIVING |

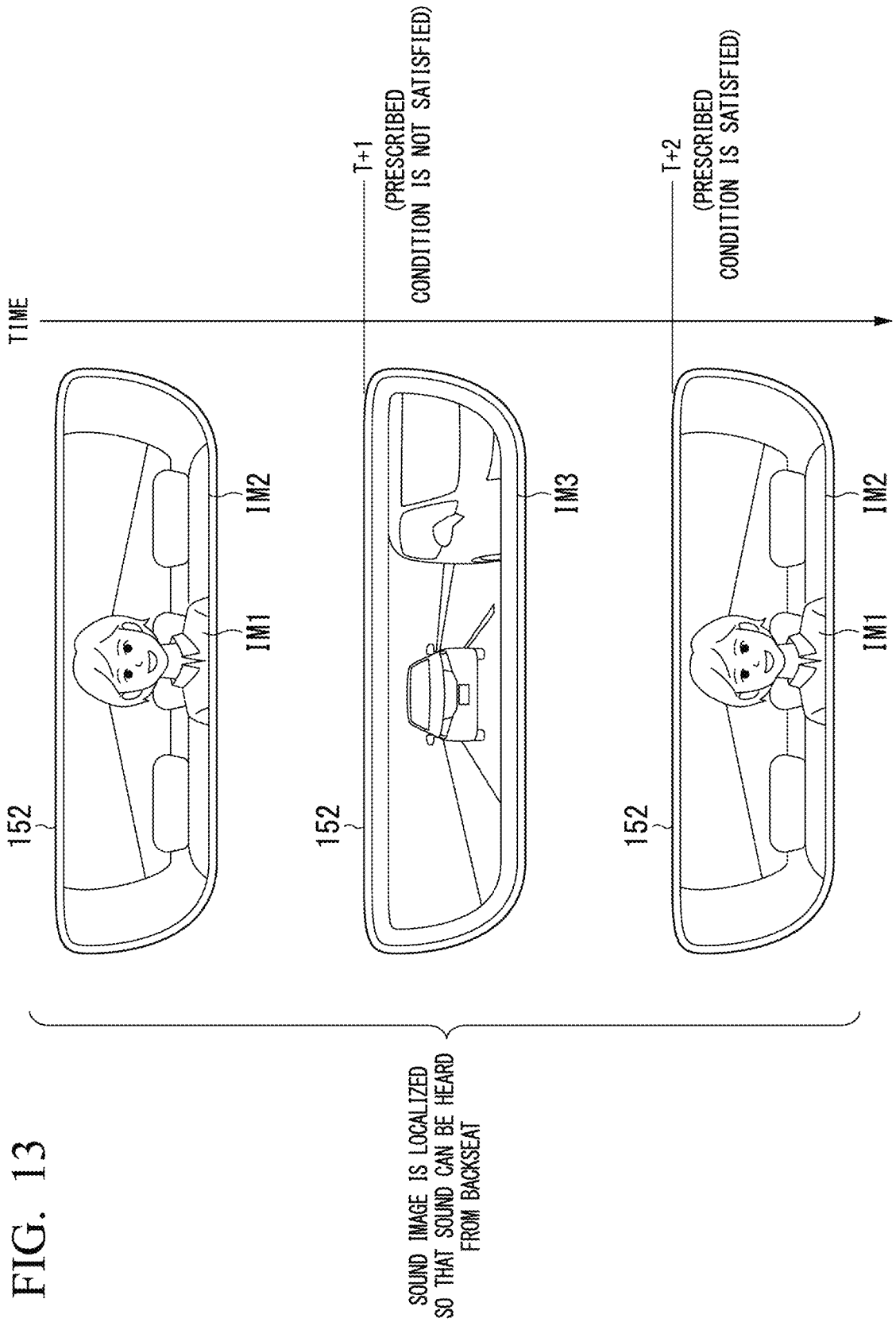

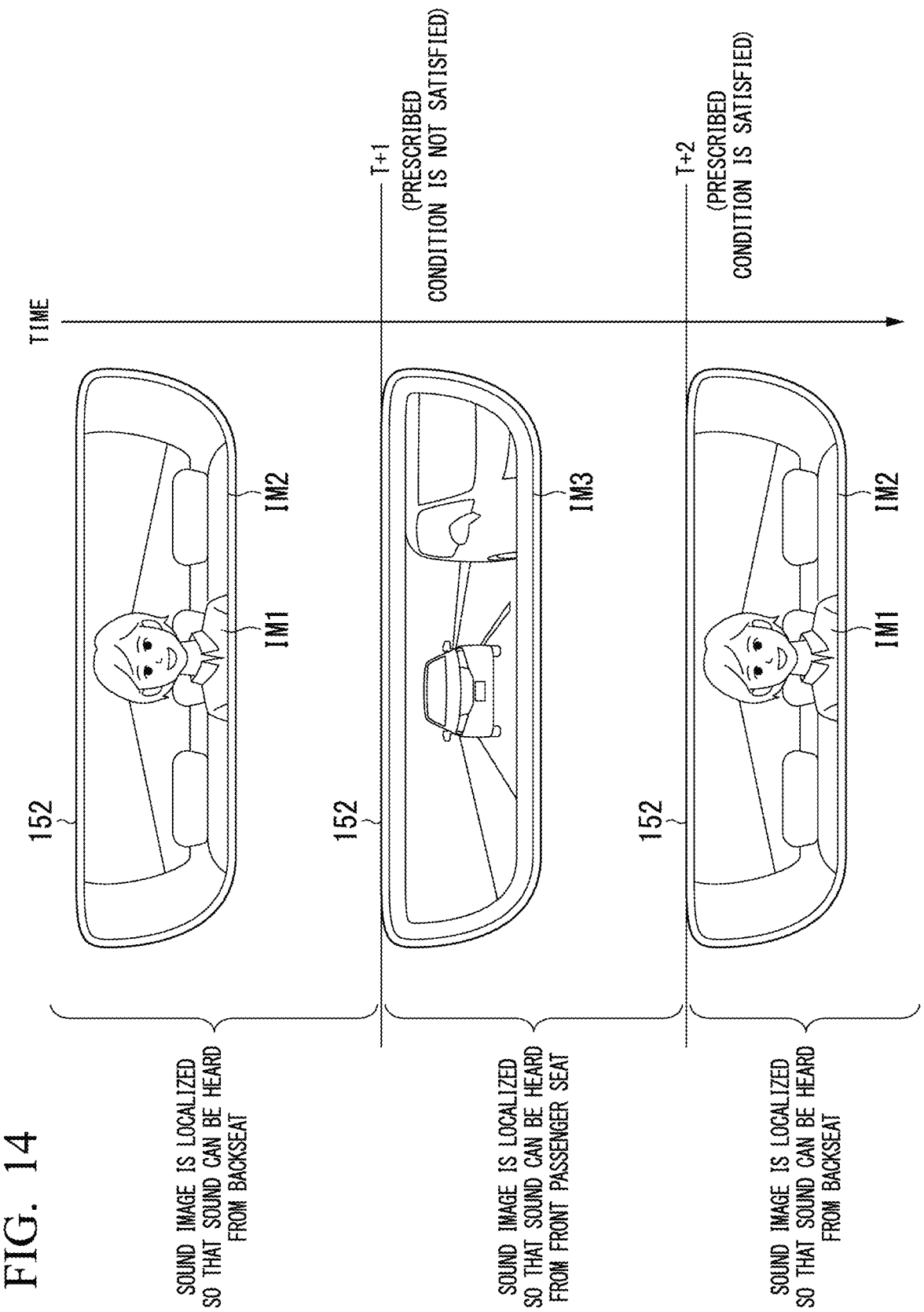

INFORMATION PROCESSING DEVICE, INFORMATION PROCESSING SYSTEM, AND INFORMATION PROCESSING METHOD

CROSS-REFERENCE TO RELATED APPLICATION

Priority is claimed on Japanese Patent Application No. 2022-146095, filed Sep. 14, 2022, the content of which is incorporated herein by reference.

BACKGROUND

Field

The present invention relates to an information processing device, an information processing system, and an information processing method.

Description of Related Art

Conventionally, research has been conducted on communicating between a device mounted in a moving object such as a vehicle and a device used at a location separate from that of the moving object and providing a user of the moving object with an image of a user of the separate location (Japanese Unexamined Patent Application, First Publication No. 2020-80542).

SUMMARY

In conventional technology, it is difficult for a user of a moving object to feel a sufficient sense of presence and it cannot be said that an entertainment property in the moving object is sufficient. In some cases, it cannot be said that the visibility is sufficiently high when a service having the entertainment property is used.

The present invention has been made in consideration of such circumstances and an objective of the present invention is to provide an information processing device, an information processing system, and an information processing method capable of improving an entertainment property. For example, it is possible to enhance a sense of presence and provide a service having a high entertainment property in consideration of visibility of a user. By extension, it will further improve traffic safety and contribute to the development of a sustainable transportation system.

An information processing device, an information processing system, and an information processing method according to the present invention adopt the following configurations.

(1): According to an aspect of the present invention, there is provided an information processing device mounted in a moving object that an occupant boards, the information processing device including: a display device having a display configured to display a person image indicating a person or a character corresponding to the person and capable of adjusting a position of the display so that an occupant of a backseat is shown in a mirror when an occupant of a driver's seat or a front passenger seat of the moving object visually recognizes the display on the assumption that the display is the mirror and the occupant is sitting in the backseat of the moving object; and a control device configured to control a first speaker within the moving object so that a sound is output from a direction of the backseat when the display is allowed to display a service image including the person image in which the person or the character is sitting in the backseat of the moving object.

(2): In the above-described aspect (1), the information processing device includes a first communication device configured to communicate with a second communication device of a second device including the second communication device and a second microphone and used by a user at a location different from that of the moving object, wherein the sound is a sound acquired via the first communication device and uttered by the user into the second microphone.

(3): In the above-described aspect (2), the person image is an image of the user using the second device or an image indicating a character corresponding to the user.

(4): In the above-described aspect (3), the control device generates the service image by synthesizing the person image with an image in which the backseat is imaged and causes the display device to display the generated service image.

(5): In any one of the above-described aspects (1) to (4), the first speaker outputs a sound by localizing a sound image so that the sound can be heard from the backseat to the occupant of the driver's seat or the front passenger seat.

(6): In the above-described aspect (5), the first speaker comprises a plurality of first sub-speakers arranged at positions different from each other, and the control device localizes the sound image so that the sound can be heard from the backseat to the occupant of the driver's seat or the front passenger seat by adjusting at least one of volumes and phase differences of the plurality of first sub-speakers.

(7): In any one of the above-described aspects (1) to (4), the display of the display device is a rearview mirror provided for the occupant of the driver's seat to visually recognize the rear of the moving object and displays an image captured by an imager configured to image the rear.

(8): In the above-described aspect (7), the rearview mirror is provided in front of the occupant of the driver's seat when the occupant of the driver's seat is sitting in the driver's seat of the moving object and is provided on a front windshield or ceiling of a cabin of the moving object.

(9): In any one of the above-described aspects (1) to (4), the control device causes the display device to display a service image including the person image when the moving object is not stopped.

(10): In any one of the above-described aspects (1) to (4), the control device causes the display to display a service image of first quality when the moving object is moving, and causes the display to display a service image of second quality higher than the first quality when the moving object is stopped.

(11): In any one of the above-described aspects (1) to (4), the control device permits the display device to display a service image including the person image when the moving object is not stopped, and causes an image captured by an imager for imaging a rear view from the moving object to be displayed without permitting the display device to display the service image including the person image when the moving object is stopped.

(12): In the above-described aspect (11), the information processing device includes a first communication device configured to communicate with a second communication device of a second device including the second communication device and a second microphone and used by a user at a location different from that of the moving object, wherein the sound is a sound acquired via the first communication device and uttered by the user into the second microphone, and wherein the control device causes the display device to display a service image including the person image when the moving object is not stopped and controls the first speaker so that the sound is output from a direction of the backseat or the driver's seat, and subsequently continuously controls the first speaker so that the sound is output when the moving object is stopped and causes the display device to display an image captured by the imager by stopping a process of causing the display device to display the service image including the person image.

(13): In any one of the above-described aspects (1) to (4), the control device permits the display device to display a service image including the person image when a shift position of the moving object is not a parking position, and causes an image captured by an imager for imaging a rear view from the moving object to be displayed without permitting the display device to display the service image including the person image when the shift position of the moving object is the parking position.

(14): In the above-described aspect (13), the information processing device includes a first communication device configured to communicate with a second communication device of a second device including the second communication device and a second microphone and used by a user at a location different from that of the moving object, wherein the sound is a sound acquired via the first communication device and uttered by the user into the second microphone, and wherein the control device causes the display device to display a service image including the person image when the shift position of the moving object is a position where the moving object can start and controls the first speaker so that the sound is output from a direction of the backseat or the driver's seat, and subsequently continuously controls the first speaker so that the sound is output when the shift position of the moving object is changed from the position where the moving object can start to a parking position and causes the display device to display an image captured by the imager.

(15): In any one of the above-described aspects (1) to (4), the control device permits the display device to display a service image including the person image when a moving object control device executes driving assistance or automated driving to control traveling of the moving object, and causes an image captured by an imager for imaging a rear view from the moving object to be displayed without permitting the display device to display the service image including the person image when a driver of the moving object performs an operation to control traveling of the moving object in a state in which the moving object control device does not execute the driving assistance or the automated driving.

(16): In the above-described aspect (15), the information processing device includes a first communication device configured to communicate with a second communication device of a second device including the second communication device and a second microphone and used by a user at a location different from that of the moving object, wherein the sound is a sound acquired via the first communication device and uttered by the user into the second microphone, and wherein the control device causes the display device to display a service image including the person image when the moving object control device executes the driving assistance or the automated driving to control traveling of the moving object and controls the first speaker so that the sound is output from a direction of the backseat or the driver's seat, and subsequently continuously controls the first speaker so that the sound is output when the driving assistance or the automated driving ends and the moving object is controlled according to an operation of the driver and causes the display device to display an image captured by the imager.

(17): In any one of the above-described aspects (1) to (4), the moving object is a vehicle.

(18): In the above-described aspect (17), the control device controls the first speaker so that the display device is allowed to display a service image including the person image and the sound is output from a direction of the backseat when the vehicle does not satisfy a condition, and controls the first speaker so that the sound is output from a direction of the front passenger seat without causing the display device to display the service image including the person image when the vehicle satisfies the condition, and the condition is that the vehicle is stopped, a shift position of the vehicle is a parking position, or the driver of the moving object performs an operation to control traveling of the moving object without executing driving assistance or automated driving.

(19): According to an aspect of the present invention, there is provided an information processing system including: the information processing device according to any one of the above-described aspects (2) to (4) and a user device, the user device having the second communication device configured to communicate with the first communication device, and a user device having the second microphone configured to collect a sound uttered by the user, wherein the second communication device transmits the sound collected by the second microphone to the first communication device.

(20): In the above-described aspect (19), the user device includes: a detection device configured to detect an oriented direction of the user; a camera having one or more cameras including at least an indoor camera provided on a prescribed seat of the moving object and configured to image an inside of the moving object seen from the prescribed seat; and a display device configured to display an image corresponding to the oriented direction seen from the prescribed seat of the moving object among images captured by the camera.

(21): In the above-described aspect (20), the second communication device transmits information of the oriented direction to the first communication device, the control device controls the first communication device so that an image corresponding to the oriented direction acquired via the first communication device among the images captured by the camera is selectively transmitted to the second communication device, and a display device of the user device displays an image corresponding to the oriented direction seen from the prescribed seat acquired via the second communication device.

(22): In the above-described aspect (20), the first communication device transmits images captured by the camera to the second communication device, and the user device causes the display device to selectively display an image corresponding to the oriented direction among the images captured by the camera.

(23): In the above-described aspect (20), the information processing device further comprises a first microphone configured to collect a sound uttered by at least the occupant, the user device further comprises a second speaker configured to output a sound uttered by the occupant acquired via the second communication device, and the first communication device transmits the sound collected by the first microphone to the second communication device.

(24): According to an aspect of the present invention, there is provided an information processing method including: when, in a display device having a display configured to display a person image indicating a person or a character corresponding to the person, the display, whose position can be adjusted so that an occupant of a backseat is shown in a mirror in a case where a driver of a moving object that an occupant boards visually recognizes the display on the assumption that the display is the mirror and the occupant is sitting in the backseat of the moving object, is allowed to display a service image including the person image in which the person or the character is sitting in the backseat of the moving object, and controlling, by a computer, a first speaker that outputs a sound so that the sound is output from a direction of the backseat.

According to aspects (1) to (24), it is possible to improve an entertainment property. For example, it is possible to enhance a sense of presence given to the occupant of the moving object.

According to aspects (9) to (16), information suitable for the driver can be provided to the driver in accordance with a situation of the moving object and convenience for the driver and improvement of the entertainment property are implemented.

According to aspect (10), the service image of the first quality is displayed because a degree to which the occupant visually recognizes the service image is relatively low when the moving object is moving and the service image of the second quality is displayed because a degree to which the occupant visually recognizes the service image is relatively high when the moving object is stopped. Thereby, service images of appropriate quality for the situation of the occupant are provided and a processing load is reduced.

According to aspect (18), because content of the displayed image and the direction from which the sound is heard are controlled in accordance with a situation of the moving object, information suitable for the occupant can be provided to the occupant and a sense of presence given to the occupant can be enhanced.

BRIEF DESCRIPTION OF THE DRAWINGS

FIG. 1 is a diagram showing a usage environment of an information processing system and a management server and the like.

FIG. 2 is a diagram showing an example of content of user data.

FIG. 10 is a diagram focusing on the service image.

FIG. 11 is a flowchart showing an example of a flow of a process executed by the first control device.

FIG. 12 is a diagram showing an example of conditions.

FIG. 13 is a diagram showing an example of a relationship between the transition of images displayed on the rearview mirror display device and a determination result of a state determiner.

FIG. 14 is a diagram showing another example of the relationship between the transition of the images displayed on the rearview mirror display device and the determination result of the state determiner.

DETAILED DESCRIPTION

Figure 3:
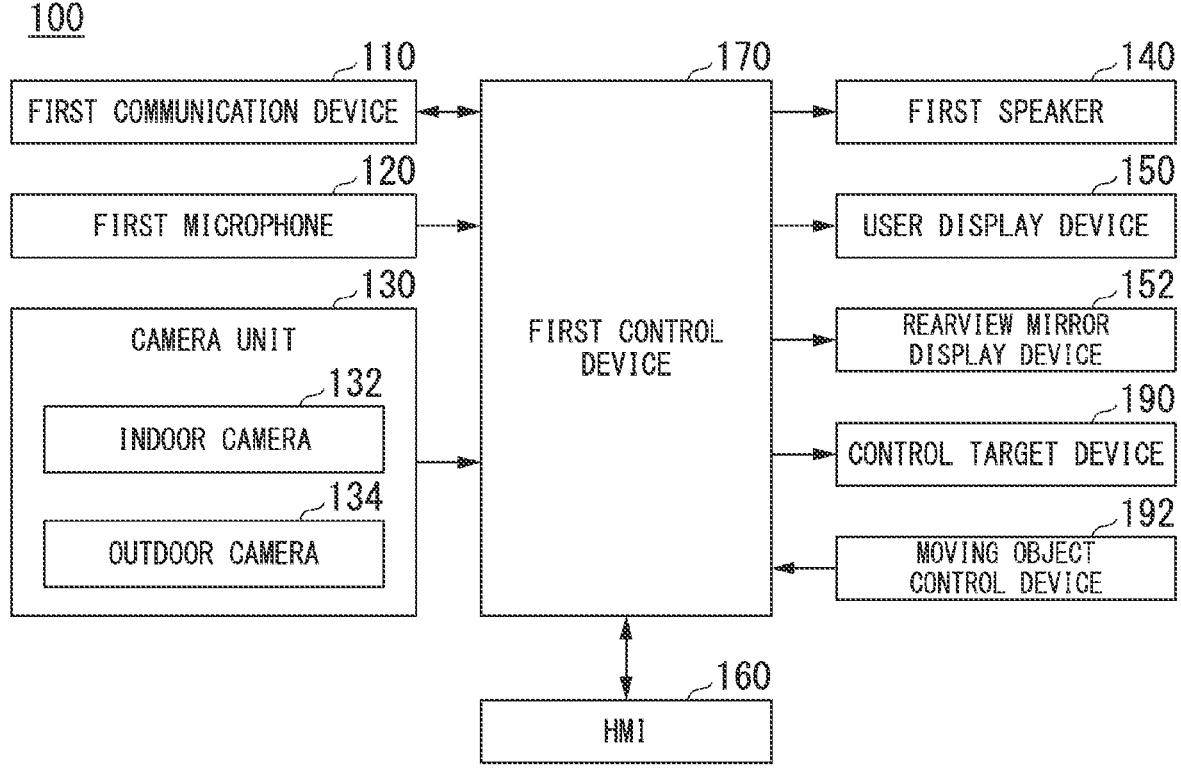
FIG. 3 is a configuration diagram of a first device.

Hereinafter, embodiments of an information processing device, an information processing system, and an information processing method of the present invention will be described with reference to the drawings. The information processing system includes a first device (an information processing device) mounted in a moving object where there are occupants (occupant can board) and a second device (a user device) used by a user at a location different from that of the moving object. The moving object is, for example, a vehicle, but any moving object that the occupant can board may be used. The occupant is mainly a driver of the moving object, but may be an occupant other than the driver. Although the information processing device (a first device 100) and the rearview mirror (a rearview mirror display device 152) are described as separate units in the following description, the present invention is not limited thereto. The information processing device and the rearview mirror may be integrally configured. That is, the rearview mirror may include the information processing device. In this case, a user who purchased a rearview mirror equipped with an information processing device as an afterthought can also obtain occupant experience according to the present invention.

Between the first device and the second device, a sound collected by a microphone is transmitted to the other party and played back by a speaker and a state similar to a telephone call is given. Furthermore, mixed reality (MR) is provided to the second device side by displaying a part of an image captured by a camera unit of the first device on the second device side. The first device and the second device do not need to be in a one-to-one relationship and one of a plurality of first devices and a plurality of second devices may be matched in a one-to-many relationship to operate as an information processing system. In the latter case, for example, one occupant can communicate with a plurality of users simultaneously or in sequence.

<Basic Configuration>

FIG. 1 is a diagram showing a usage environment of an information processing system 1 and a management server 300 and the like. The information processing system 1 includes a first device (moving object device) 100 mounted in a moving object M and a second device (user device) 200 used by a user U at a location different from that of the moving object M (a location that happens to be close to the moving object M is not excluded). The first device 100, the second device 200, and the management server 300 communicate with each other via a network NW. The information processing system 1 may or may not include the management server 300.

The management server 300 includes, for example, a communication device 310, a matching processor 320, and a storage 350. User data 360 is stored in the storage 350.

The communication device 310 is a communication interface for connecting to the network NW. Communication between the communication device 310 and the first device 100 and communication between the communication device 310 and the second device 200 are performed according to, for example, a transmission control protocol/Internet protocol (TCP/IP).

The matching processor 320, for example, is implemented by a processor such as a central processing unit (CPU) executing a program (a command group) stored in a storage medium. The storage 350 is a random-access memory (RAM), a hard disk drive (HDD), a flash memory, or the like.

FIG. 2 is a diagram showing an example of content of the user data 360. The user data 360 includes, for example, an occupant list 360A in which an occupant ID, which is identification information of an occupant P, its communication identification information (an IP address or the like), and a user ID, which is identification information of a user U serving as a matching target, are associated with each other and a user list 360B in which a user ID, its communication identification information (an IP address or the like), and an occupant P serving as a matching target are associated with each other. The user data 360 may be generated in any form other than the form shown in FIG. 2 as long as it includes such information.

When the communication device 310 has received a matching request from the user U via the second device 200 or from the occupant P via the first device 100, the matching processor 320 performs matching of the matching user U and the occupant P with reference to the user data 360, transmits communication identification information of the first device 100 of the occupant P to the second device 200 of the matching user U using the communication device 310, and transmits the communication identification information of the second device 200 of the user U to the first device 100 of the matching occupant P using the communication device 310. Between the first device 100 and the second device 200 that have received the communication identification information, communication with a higher real-time property is performed in accordance with, for example, a user datagram protocol (UDP).

FIG. 3 is a configuration diagram of the first device 100. The first device 100 includes, for example, a first communication device 110, a first microphone 120, a camera unit 130, a first speaker 140, a user display device 150, a rearview mirror display device 152, a human machine interface (HMI) 160, and a first control device ("control device") 170. The first control device 170 is connected to a control target device 190 and a moving object control device 192 mounted in the moving object M.

The first communication device 110 is a communication interface for communicating with each of the communication device 310 of the management server 300 and the second communication device 210 of the second device 200 via the network NW.

The first microphone 120 collects at least a sound uttered by the occupant P. The first microphone 120 may be provided inside of the moving object M and have sensitivity for collecting a sound outside of the moving object M or may include a microphone provided inside of the moving object M and a microphone provided outside the moving object M. The first communication device 110, for example, transmits the sound collected by the first microphone 120 to the second communication device 210 via the first control device 170.

The camera unit 130 may include at least an indoor camera 132 and may include an outdoor camera 134. The outdoor camera 134 includes, for example, a camera that images the rear of the moving object M. A captured image is displayed on the HMI 160, the rearview mirror display device 152, or the like. Thereby, the occupant of the moving object can recognize a situation of the rear. The first speaker 140 outputs a sound uttered by the user U acquired via the first communication device 110. Details such as an arrangement of the camera unit 130 and the first speaker 140 will be described below with reference to FIG. 4.

The user display device 150 virtually displays the user U as if the user U is located in the cabin of the moving object M. For example, the user display device 150 causes a hologram to appear or causes the user U to be displayed on a portion corresponding to a mirror or a window of the moving object M.

The rearview mirror display device 152 is a rearview mirror provided for the occupant in the driver's seat to visually recognize the rear of the moving object M. The rearview mirror display device 152 is provided, for example, on a front windshield or a ceiling in the cabin of the moving object in front of the occupant of the driver's seat when the occupant of the driver's seat has sat in the driver's seat of the moving object. The rearview mirror display device 152 has a mirror/display surface, shows a physical object according to the reflection of light when the mirror/display surface functions as the display for displaying an image in a mirror mode, and displays an image captured by the camera for imaging a rear view from the moving object M when the mirror/display surface functions as the display for displaying the image or a service image to be described below. For example, by operating a switch provided on the rearview mirror display device 152, the mode is switched between the mirror mode and the monitor mode. The rearview mirror display device 152 is an example of a "display device."

Although it is assumed that a service image including a person image is displayed on the rearview mirror display device 152 in the present embodiment, a service image may be displayed on another display device (another example of the "display device") provided in the cabin instead of (or in addition to) this. This display device may be, for example, a mirror display device for confirming the backseat so that the occupant in the driver's seat or the front passenger seat can confirm or visually recognize the backseat or the occupant of the backseat. This mirror display device has a mirror/display surface, shows a physical object according to the reflection of light when the display surface functions as a mirror in a mirror mode, and displays an image of a cabin camera or a service image when the display surface functions as a display for displaying an image in a monitor mode. Also, as described above, the rearview mirror display device 152 may include a functional configuration similar to that of a first control device ("control device") 170 and may execute a process of controlling the display of the service image and a process of controlling the first speaker 140.

As described above, the position of the mirror/display surface of the rearview mirror display device 152 or another display device provided in the cabin can be adjusted. The rearview mirror display device 152 or the other display device provided in the cabin, for example, can adjust the position of the display so that the occupant in the backseat is shown in the mirror when the occupant of the driver's seat or the front passenger seat of the moving object M has visually recognized the display on the assumption that the display is a mirror and the occupant is sitting in the backseat of the moving object M. For example, the rearview mirror display device 152 or another display device provided in the cabin is a display device capable of adjusting the position of the display so that a person image is displayed at a position where the occupant of the backseat is shown in the mirror when the occupant in the driver's seat or the front passenger seat of the moving object M visually recognizes the occupant of the backseat of the moving object M via the mirror. If the position of the display can be adjusted, this, for example, indicates that the occupant can adjust the attitude, angle, and direction of the display (for example, a direction facing the driver's seat, the front passenger seat, or the backseat).

The HMI 160 is a touch panel, a voice response device (an agent device), or the like. The HMI 160 receives various types of instructions from the occupant P for the first device 100.

The first control device 170 includes, for example, a processor such as a CPU, and a storage medium that is connected to the processor and stores a program (a command group), and the processor executes the command group to control each part of the first device 100.

The control target device 190 is, for example, a navigation device mounted in the moving object M, a driving assistance device, or the like.

The moving object control device 192 is a control device that controls one or both of steering and acceleration/deceleration of the vehicle. For example, the moving object control device 192 controls the steering of the moving object M so that the moving object M travels within a lane. For example, the moving object control device 192 controls the acceleration/deceleration of the moving object M so that an inter-vehicle distance from a preceding vehicle is a prescribed distance or controls the acceleration and deceleration of the moving object M so that the moving object M travels while maintaining a prescribed speed. The moving object control device 192 may, for example, perform automated driving to control the moving object M without depending on an operation of the driver. For example, driving assistance or automated driving includes, for example, a first mode in which the driver does not perform an operation and the driver does not need to monitor the surroundings, a second mode in which the driver does not perform an operation and the driver needs to monitor the surroundings, and a third mode in which the driver performs an operation and the driver needs to monitor the surroundings. The moving object control device 192 provides the first control device 170 with the state of the moving object M such as the speed of the moving object M and the shift position.

Figure 4:
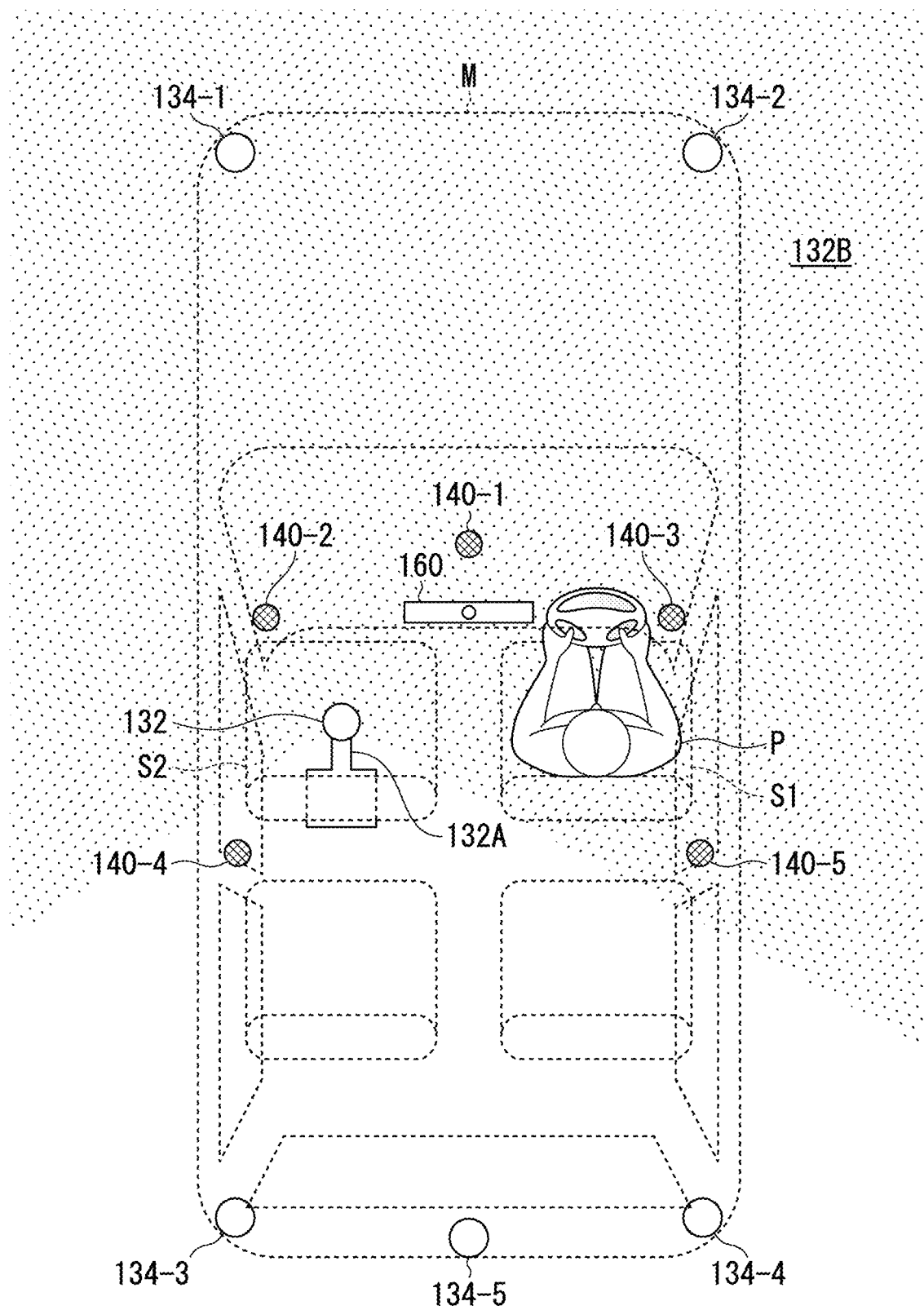
FIG. 4 is a diagram showing an example of an arrangement of a part of the first device in a moving object M.

FIG. 4 is a diagram showing an example of an arrangement of a part of the first device 100 in the moving object M. The indoor camera 132 is attached, for example, to a neck pillow of the front passenger seat S2 (an example of a "prescribed seat") via an attachment 132A and is located slightly away from a backrest of the front passenger seat S2 in a travel direction of the moving object M. The indoor camera 132 has a wide-angle lens and can image a range indicated by a hatched area 132B in FIG. 4. The indoor camera 132 can image not only the interior of the moving object M but also the exterior thereof through the window. In the following description, it is assumed that the front passenger seat S2 is a prescribed seat, but the prescribed seat may be another seat such as a backseat.

The outdoor camera 134 includes, for example, a plurality of outdoor sub-cameras 134-1 to 134-5. An image such as a panoramic image obtained by imaging the outside of the moving object M can be obtained by synthesizing images captured by the plurality of outdoor sub-cameras 134-1 to 134-5. The outdoor camera 134 may include a wide-angle camera provided on the roof of the moving object M instead of (or in addition to) these. A camera capable of imaging a rear view from the front passenger seat S2 may be added as the indoor camera 132 and the image of the moving object to be described below may be generated as a 360-degree panoramic image by combining images captured by one or more indoor cameras 132 by the first control device 170 or a 360-degree panoramic image may be generated by appropriately combining an image captured by the indoor camera 132 and an image captured by the outdoor camera 134. The outdoor sub-camera 134-5 is an example of an "imager for imaging a rear view from the moving object".

The first speaker 140 outputs a sound of the user U acquired via the first communication device 110. The first speaker 140 includes, for example, a plurality of first sub-speakers 140-1 to 140-5. For example, the first sub-speaker 140-1 is arranged at the center of the instrument panel, the first sub-speaker 140-2 is arranged at the left end of the instrument panel, the first sub-speaker 140-3 is arranged at the right end of the instrument panel, the first sub-speaker 140-4 is arranged below the left door, and the first sub-speaker 140-5 is arranged below the right door. The first control device 170, for example, causes sounds with similar volumes to be output from the first sub-speaker 140-2 and the first sub-speaker 140-4, turns off the other first sub-speakers, and localizes the sound image so that the occupant P sitting in the driver's seat S1 can hear the sound from the front passenger seat S2. The first control device 170, for example, causes sounds with about the same volume to be output from the first sub-speaker 140-4 and the first sub-speaker 140-5, and turns off the other first sub-speakers to localize the sound image so that the occupant P sitting in the driver's seat S1 can hear the sound from the backseat. The sound image localization method is not limited to the adjustment of the volume, but may be performed by shifting a phase of the sound output by each first sub-speaker. For example, when the sound image is localized so that the sound can be heard from the left side, it is necessary for a timing when the sound is output from the left first sub-speaker to be slightly earlier than a timing when the same sound is output from the right first sub-speaker. For example, when the sound image is localized so that the sound can be heard from the rear side, it is necessary for a timing when the sound is output from the rear first sub-speaker to be slightly earlier than a timing when the same sound is output from the front first sub-speaker.

When the first speaker 140 is allowed to output a sound of the user U, the first control device 170 may cause the sound uttered by the user U to be output to the first speaker 140 by localizing the sound image so that the sound can be heard from a height position corresponding to a height of the head of the user U on the front passenger seat S2 with respect to the occupant P. In this case, the first speaker 140 needs to have a plurality of first sub-speakers 140-k (k is a plurality of natural numbers) with different heights.

The first control device 170, for example, controls the rearview mirror display device 152. The first control device 170, for example, controls an image displayed on the rearview mirror display device 152. Details will be described below.

Figure 5:
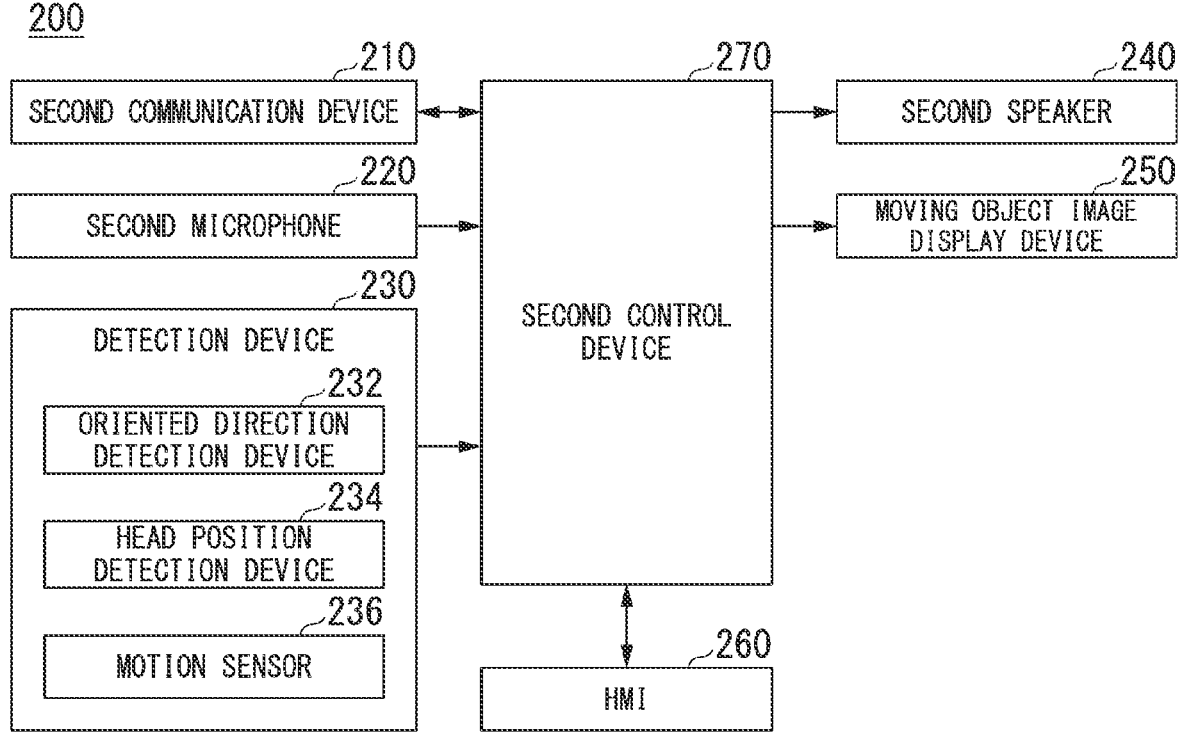
FIG. 5 is a configuration diagram of a second device.

FIG. 5 is a configuration diagram of the second device 200. The second device 200 includes, for example, a second communication device 210, a second microphone 220, a detection device 230, a second speaker 240, a moving object image display device 250, an HMI 260, and a second control device 270. The detection device 230 includes, for example, an oriented direction detection device 232, a head position detection device 234, and a motion sensor 236.

The second communication device 210 is a communication interface for communicating with each of the communication device 310 of the management server 300 and the first communication device 110 of the first device 100 via the network NW.

The second microphone 220 collects the sound uttered by the user U. The sound collected by the second microphone 220, for example, is transmitted to the first communication device 110 by the second communication device 210 via the second control device 270.

The oriented direction detection device 232 is a device for detecting the oriented direction. The oriented direction is a direction based on a direction of a face of the user U, a direction of a visual line, or both. Alternatively, the oriented direction may be a direction indicated by the motion of the arm or fingers, such as an action of tilting the terminal device used by the user U or an action of swiping the screen. Hereinafter, the oriented direction is an angle in a horizontal plane, i.e., an angle that does not have a component in a vertical direction, but the oriented direction may be an angle that also includes a component in the vertical direction. The oriented direction detection device 232 may include a physical sensor (for example, an acceleration sensor, a gyro sensor, or the like) attached to VR goggles to be described below, an infrared sensor that detects a plurality of positions of the user U's head, or a camera that images the user U's head. In either case, the second control device 270 calculates the oriented direction on the basis of the information input from the oriented direction detection device 232. Because various types of technology for this are known, detailed description thereof will be omitted.

The head position detection device 234 is a device for detecting the position (height) of the user U's head. For example, one or more infrared sensors or optical sensors provided around a chair in which the user U sits are used as the head position detection device 234. In this case, the second control device 270 detects the position of the user U's head on the basis of the presence or absence of detection signals from one or more infrared sensors or optical sensors. The head position detection device 234 may be an acceleration sensor attached to the VR goggles. In this case, the second control device 270 detects the position of the user U's head by integrating values obtained by subtracting the gravitational acceleration from the output of the acceleration sensor. The information about the position of the head acquired in this way is provided to the second control device 270 as height information. The position of the user's head may be obtained on the basis of an operation of the user U on the HMI 260. For example, the user U may input his/her height to the HMI 260 using numbers or may input his/her height using a dial switch included in the HMI 260. In these cases, the head position, i.e., the height information, is calculated from the height. The user U may input a discrete value such as physique: a large/medium/small size to the HMI 260 instead of a continuous value. In this case, the height information is acquired on the basis of the information indicating the physique. The height of the head of the user U may be simply acquired on the basis of the general physique of an adult (which may be gender-specific) without particularly acquiring the height of the user's head.

The motion sensor 236 is a device for recognizing a gesture operation performed by the user U. For example, a camera that images the upper body of the user U is used as the motion sensor 236. In this case, the second control device extracts feature points (fingertips, wrists, elbows, and the like) of the user U's body from the image captured by the camera and recognizes the gesture operation of the user U on the basis of the motions of the feature points.

The second speaker 240 outputs a sound uttered by the occupant P acquired via the second communication device 210. The second speaker 240 has, for example, a function of changing a direction from which a sound is heard. The second control device 270 causes the second speaker to output the sound so that the user U can hear the sound from the position of the occupant P seen from the front passenger seat S2. The second speaker 240 includes a plurality of second sub-speakers 240-$n$ ($n$ is a plurality of natural numbers) and sound image localization may be performed by the second control device 270 adjusting the volume of each second sub-speaker 240-$n$ or sound image localization may be performed using the function of headphones when the headphones are attached to the VR goggles.

Figure 6:
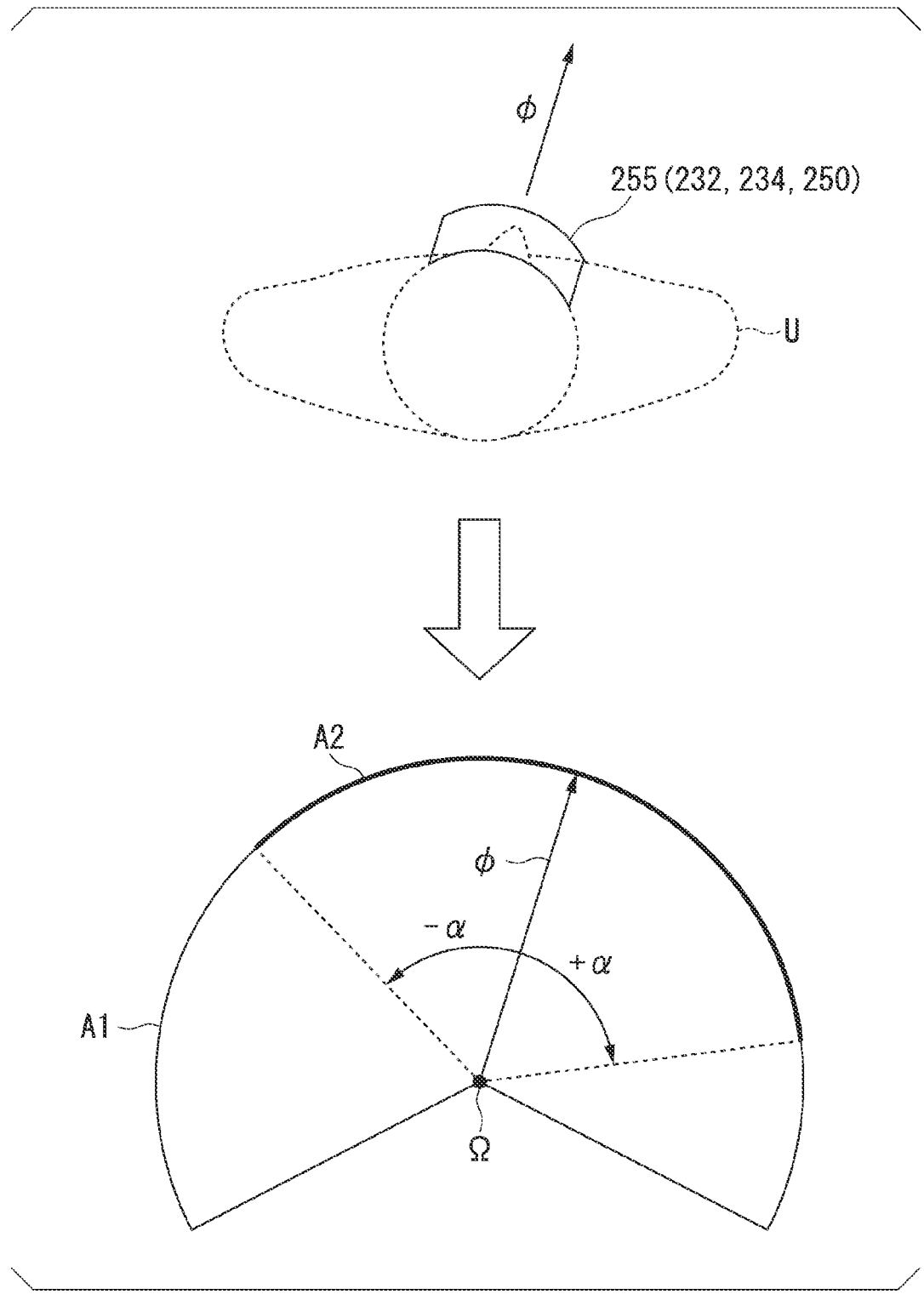
FIG. 6 is a diagram for describing an image corresponding to an oriented direction.

The moving object image display device 250 displays an image corresponding to the oriented direction seen from the front passenger seat among the images captured by the camera unit 130 (which may be images subjected to the above-described combination process and will be referred to as moving object images hereinafter). FIG. 6 is a diagram for describing an image corresponding to an oriented direction. In the example of FIG. 6, the VR goggles 255 include an oriented direction detection device 232, a physical sensor serving as a head position detection device 234, and a moving object image display device 250. The second control device 270 detects a direction in which the VR goggles 255 face as an oriented direction $\phi$ using a pre-calibrated direction as a reference direction. Because various methods for such functions are already known, detailed description thereof will be omitted.

The moving object image display device 250 displays, to the user U, an image A2 within an angle range of $\pm\alpha$ centered on an oriented direction $\phi$ among moving object images A1 (which have an angle of about 240 degrees in the drawing, but an angle of view may be expanded by a combination process as described above).

The HMI 260 is a touch panel, a voice response device (an agent device), the switch described above, or the like. The HMI 260 receives various types of instructions from the occupant P to the second device 200.

The second control device 270 includes, for example, a processor such as a CPU, and a storage medium connected to the processor and storing a program (a command group), and the processor executes the command group to control each part of the second device 200.

<Functional Configuration>

Figure 7:
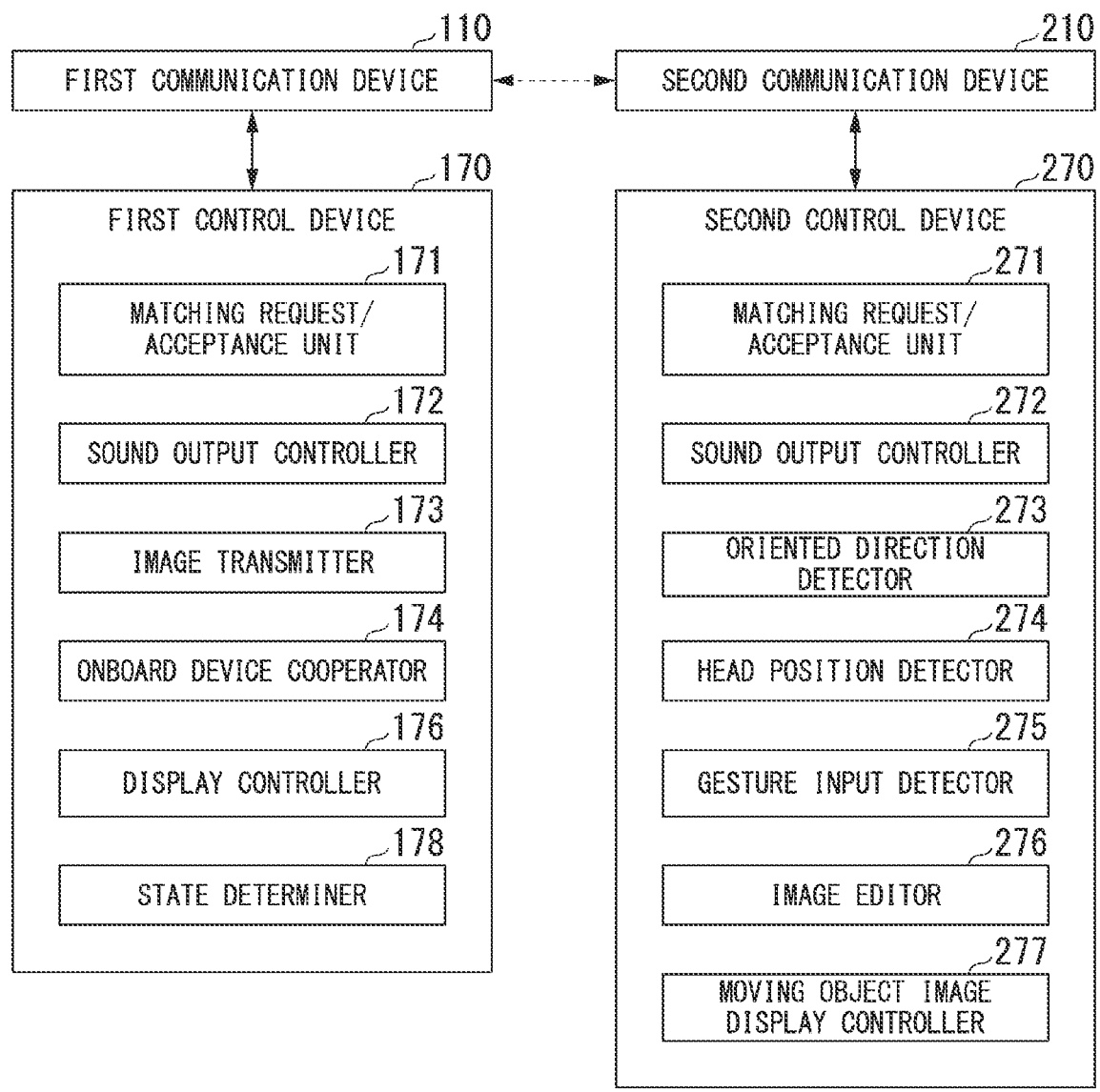
FIG. 7 is a diagram showing a first example of a functional configuration of a first control device and a second control device.

A functional configuration of the first control device 170 and the second control device 270 will be described below. FIG. 7 is a diagram showing an example of a functional configuration of the first control device 170 and the second control device 270. The first control device 170 includes a matching request/acceptance unit 171, a sound output controller 172, an image transmitter 173, an onboard device cooperator 174, a display controller 176, and a state determiner 178. The second control device 270 includes a matching request/acceptance unit 271, a sound output controller 272, an oriented direction detector 273, a head position detector 274, a gesture input detector 275, an image editor 276, and a moving object image display controller 277. Each of these functional units is implemented, for example, by a processor such as a CPU executing a program (a command group). Also, some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation.

The matching request/acceptance unit 171 uses the HMI 160 to receive an input of a matching request from the occupant P and transmit the received input to the management server 300 or receive an input of acceptance for the matching request received from the management server 300 using the HMI 160 and transmit the received input to the management server 300. The matching request/acceptance unit 171 controls the first communication device 110 so that the second device 200 of the user U with whom matching has been established is a communication partner.

The sound output controller 172 controls the first speaker 140 as described above.

The image transmitter 173 uses the first communication device 110 to transmit a moving object image A1 to the second device 200.

The onboard device cooperator 174 controls the control target device 190 on the basis of an instruction signal input from the second device 200.

The display controller 176 causes the rearview mirror display device 152 to display a service image including a person image in which a person or character is sitting in the backseat of the moving object M.

The state determiner 178 determines whether or not the moving object M satisfies the condition on the basis of the state of the moving object M (see FIG. 12 to be described below).

The matching request/acceptance unit 271 receives an input of a matching request from the user U using the HMI 260 and transmits the received input to the management server 300 or receives an input of acceptance for the matching request received from the management server 300 using the HMI 260 and transmits the received input to the management server 300. The matching request/acceptance unit 271 controls the second communication device 210 so that the first device 100 of the occupant P with whom matching has been established is a communication partner.

The sound output controller 272 controls the second speaker 240 as described above.

The oriented direction detector 273 detects the oriented direction $\phi$ on the basis of the output of the oriented direction detection device 232. The head position detector 274 detects the height of the user U's head on the basis of the output of the head position detection device 234. The head position may be expressed as three-dimensional coordinates or simply the height of the head may be detected as the head position. The gesture input detector 275 detects a gesture input of the user U on the basis of an output of the motion sensor 236.

The image editor 276 performs a process of cutting out an image A2 corresponding to the oriented direction $\phi$ from the moving object image A1 seen from the front passenger seat (FIG. 6). The moving object image display controller 277 causes the moving object image display device 250 to display the image A2 cut out by the image editor 276. At this time, the image editor 276 may cause the moving object image display device 250 to display an image corresponding to the oriented direction $\phi$ seen from the height indicated in the height information of the user U's head.

The first control device 170 may include an image editor having the same function as the image editor 276 and the second control device 270 may include the oriented direction transmitter without including the image editor 276. The oriented direction transmitter 278 transmits the oriented direction $\phi$ detected by the oriented direction detector 273 to the first device 100 using the second communication device 210 and the image editor of the first control device 170 performs a process of cutting out an image A2 corresponding to the oriented direction $\phi$ (transmitted from the second device 200) from the moving object image A1 seen from the front passenger seat (FIG. 6).

<Others>

Although a case where the user U visually recognizes any direction seen from the passenger seat S2 in the information processing system 1 has been described, a direction in which a visual recognition process of the user U is possible may be limited, for example, according to an arrangement at the time of matching. For example, the occupant P may request that the scenery in the travel direction of the moving object M or the scenery on the opposite side of the driver's seat S1 be provided, but the occupant P may want not to display his or her own image. This is based on the assumption of a case corresponding to a need that the occupant P and the user U want to confirm the driving feeling of the moving object M or want to visually recognize the desired street scenery, regardless of whether they are family members or friends. In this case, such a limit is set when the matching processor 320 of the management server 300 performs the matching process and the first control device 170 or the second control device 270, in accordance with the setting, masks the angle range that is not visible, or performs a correction process so that the oriented direction $\phi$ is not directed to the restricted direction. Information about such restrictions relates to the privacy of the occupant P and thus may be set on the first device 100 side.

Figure 8:
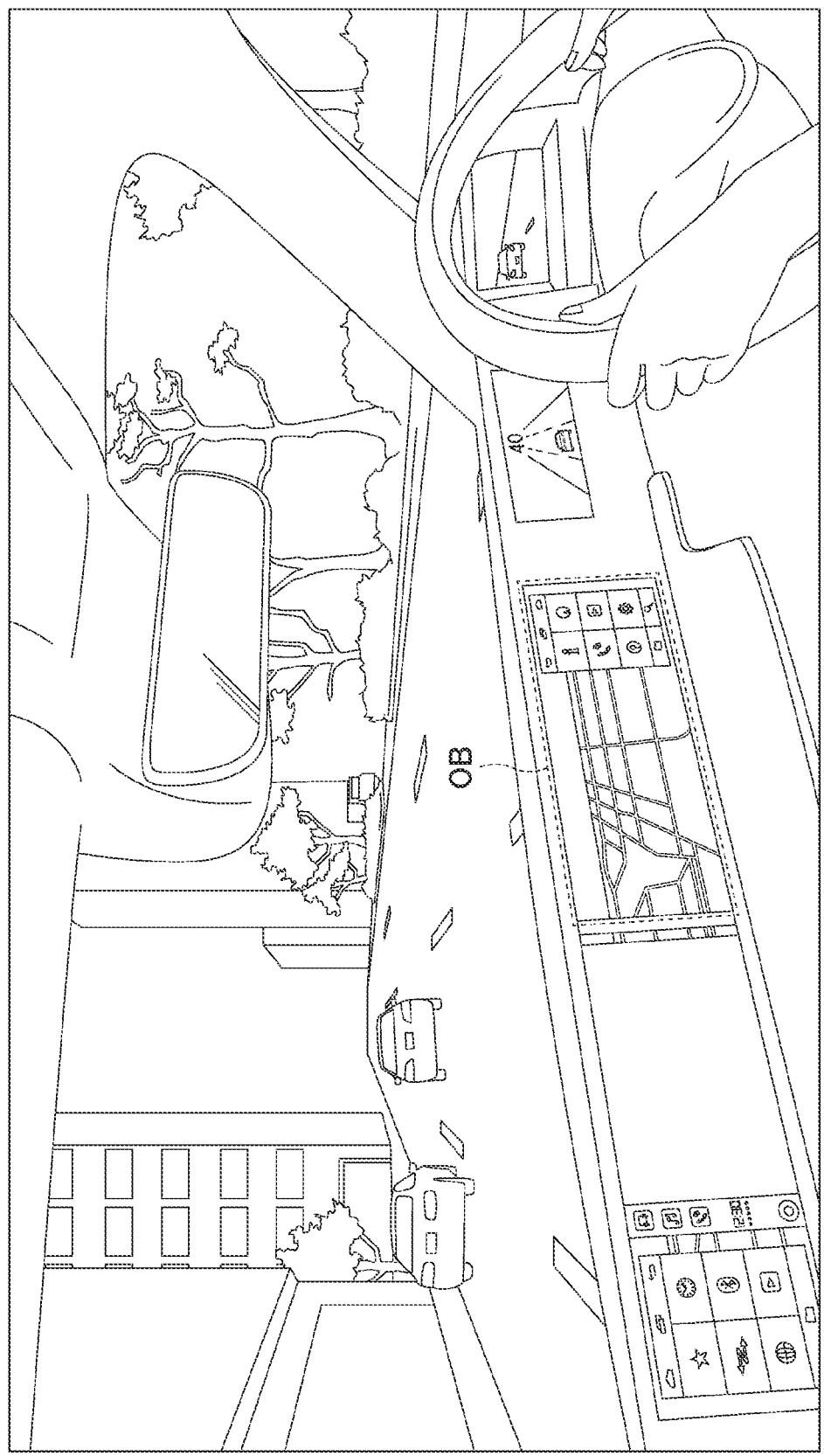
FIG. 8 is a diagram showing an example in which a replacement image is displayed.

The moving object image display device 250 may replace a part of the image captured by the camera unit 130 showing a prescribed article in the cabin of the moving object M with an image (a CG image) drawn by computer processing and display the image (CG image). FIG. 8 is a diagram showing an example in which a replacement image is displayed. In FIG. 8, OB denotes a display device that performs a navigation display process or the like and is an example of the "prescribed article." If an image obtained by imaging the display screen of the display device is displayed as it is, the image may be blurred or the visibility may deteriorate due to reflection of light. For this reason, the moving object image display device 250 may acquire data constituting a display screen of a related display device or image data drawn according to computer processing in the moving object M from the first device and may display a result obtained by embedding the image re-drawn according to computer processing from data or the acquired image data in (an image obtained by editing) the image captured by the camera unit 130. In this case, a position of an article in the cabin of the moving object M that becomes a prescribed article is shared in advance between the first device 100 and the second device 200 and the moving object image display controller 277 determines whether or not the image displayed on the moving object image display device 250 includes the prescribed article on the basis of, for example, the oriented direction $\phi$, and replaces the image as described above when it is determined that the image includes the prescribed article. The "prescribed article" may be the occupant P's head or face. In this case, a CG image such as an avatar may be changed in accordance with the display of the occupant P.

SUMMARY

According to the information processing system 1 configured as described above, it is possible to enhance a sense of presence given to both the occupant P of the moving object M and the user U who is at a location different from that of the moving object M. Because an image corresponding to the oriented direction ϕ of the user U seen from the front passenger seat is displayed to the user U, the user U can visually recognize the scenery as if he or she is sitting on the front passenger seat S2 and looking over the surroundings. Also, the first speaker 140 localizes a sound image so that the occupant P can hear a sound from the front passenger seat S2 and outputs the sound uttered by the user U, so that the occupant P can have a conversation with the user U as if the user U is in the front passenger seat S2. Further, the second speaker 240 localizes the sound image so that the user U can hear the sound from the position of the occupant P seen from the front passenger seat S2 and outputs the sound uttered by the occupant P, so that the user U can talk with the occupant P as if he or she is in the front passenger seat S2.

Usage Example

The information processing system 1 can be used in the following modes.
(A) Mode in which the occupant P and the user U are in a relationship of a family, a friend, others, and the like and a virtual drive is provided to the user U. The user U can talk with the occupant P about the surrounding scenery of the moving object M while viewing the image.
(B) Mode in which the occupant P is a general user and the user U is a provider of a route guidance service, a driving instruction service, and the like. The user U can perform route guidance or a driving operation instruction at a location that is unlikely to be understood with a navigation device or that is not shown on a map, while viewing the scenery around the moving object M.
(C) Mode in which the occupant P is a celebrity, the user U is a general user, and the user U to which a commercial-based virtual drive is provided. In this case, a plurality of users U may be associated with one occupant P at the same time, and, for example, the transfer of a sound from the user U side may be set in the OFF state.

Process in Which User is Displayed on Rearview Mirror Display Device

The first control device 170 may cause the display of the rearview mirror display device 152 to display a service image including a person image in which a person or a character corresponding to the person is sitting in the backseat of a moving object. The first control device 170 may control the first speaker 140 so that a sound is output from the direction of the backseat when causing the display of the rearview mirror display device 152 to display the service image. The sound output from the direction of the backseat is, for example, the sound uttered by the user U into the second microphone 220, transmitted by the second communication device 210, and acquired via the first communication device 110. The first control device 170, for example, localizes the sound image so that the sound can be heard from the backseat with respect to the occupant of the driver's seat or the front passenger seat and causes the first speaker 140 to output the sound.

Figure 9:
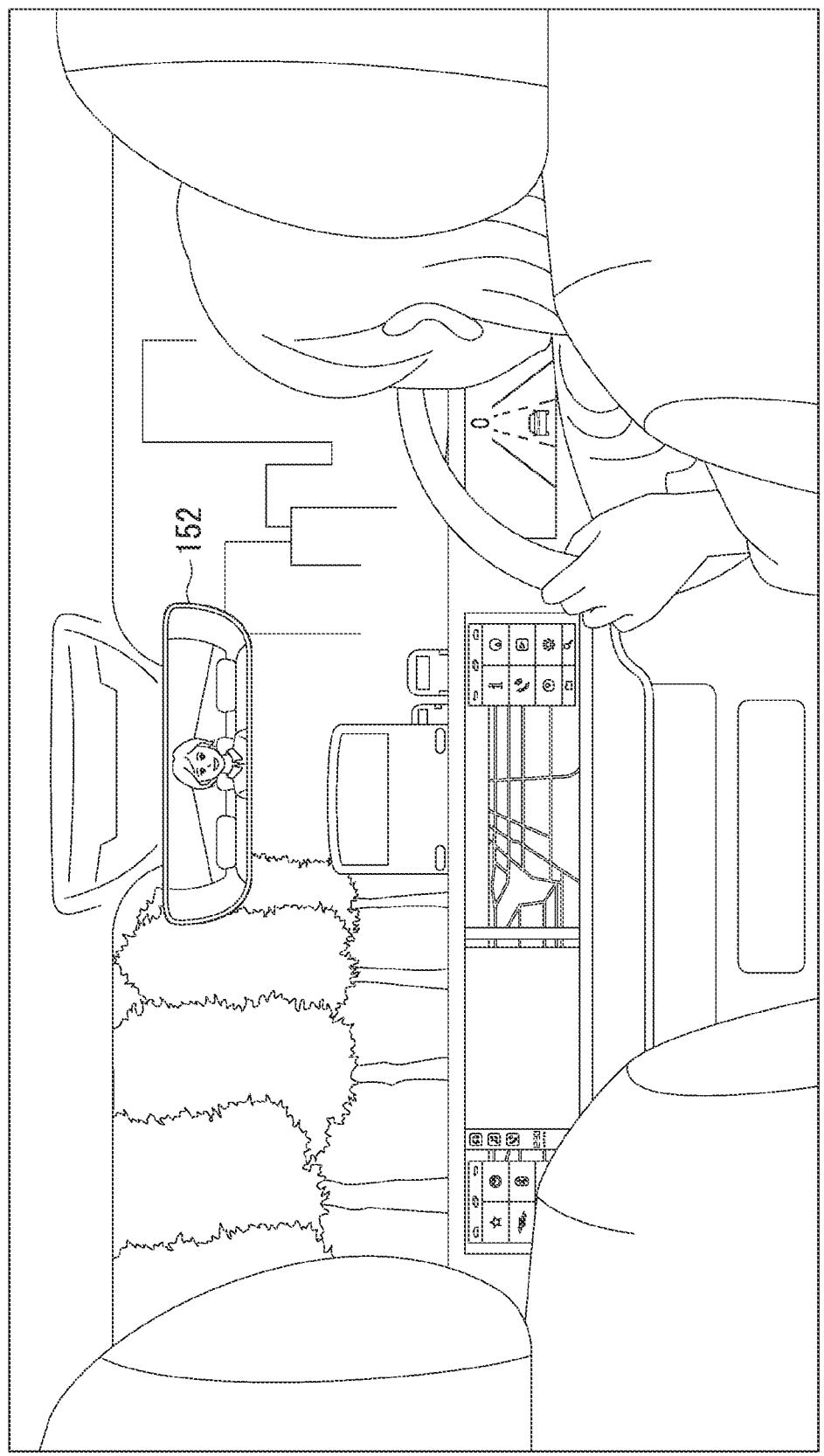
FIG. 9 is a diagram showing an example of a service image displayed on a display of a rearview mirror display device.

FIG. 9 is a diagram showing an example of a service image displayed on the display of the rearview mirror display device 152. As shown in FIG. 9, when an occupant visually recognizes the display of the rearview mirror display device 152, a service image including a person image is displayed on the display of the rearview mirror display device 152 as if the user U is actually sitting in the backseat.

FIG. 10 is a diagram focusing on a service image. A service image IM2 is, for example, an image obtained by synthesizing a person image IM1 and an image (a background image) in which the backseat is imaged. The person image IM1 is an image of the user U who uses the second device 200. The person image IM1 may be an image pre-stored in the storage device of the first device 100 or an image transmitted from the second device 200. The person image IM1 may be an image showing a character corresponding to the user U. The person image IM1 may be an image of an avatar corresponding to the user. The person image IM1 may be, for example, an image of the user of the second device 200 after the VR goggles used by the user are removed in a process such as CG. The background image may be an image pre-stored in the storage device of the first device 100 or an image captured by the indoor camera 132. For example, the display controller 176 generates the service image IM2 by synthesizing the person image IM1 with the background image so that the person in the person image IM1 sits in the backseat in the background image. A process of synthesizing the images may be performed by the second device 200 and the first device 100 may acquire a synthetic image from the second device 200.

The service image may be displayed both when the moving object M is moving and when the moving object M is stopped or the service image may be displayed only when the moving object M is moving or when the moving object M is stopped as will be described below. The quality of the service image displayed when the moving object M is moving may be different from the quality of the service image displayed when the moving object M is stopped. For example, one may be of high quality and the other of low quality. For example, the quality of the service image displayed when the moving object M is stopped may be superior to the quality of the service image displayed when the moving object M is moving. The superior quality of the service image indicates that the service image is displayed so that it can be seen more clearly when seen by the user. The superior quality of the service image indicates, for example, a superior frame rate, superior image quality, a larger number of pixels, and the like. Because the display of the rearview mirror display device 152 may not continue to be watched when the moving object M is moving and the wireless communication state may not be stable when the moving object M is moving, it is preferable to lower the quality of the service image when the moving object M is moving. Because the display of the rearview mirror display device 152 can be more likely to be watched when the moving object M is stopped than when the moving object M is moving and the wireless communication state may be more stable when the moving object M is stopped than when the moving object M is moving, it is preferable to control the quality as described above. Alternatively, the service image quality may be determined on the basis of the wireless communication quality. For example, if the quality of wireless communication is less than a prescribed threshold value, a lower-quality service image may be displayed. The quality of wireless communication is indicated by indices obtained from information for evaluating the quality of wireless communication, such as a radio wave intensity, a communication delay time, and a communication speed. Thereby, communication resources can be secured for communication of sound data output from the first speaker 140 via the first communication device 110, and voice communication can be maintained to a certain extent regardless of the quality of wireless communication.

Specific Example of Process

The first control device 170 may determine whether to display the service image IM2 on the rearview mirror display device 152 in accordance with a condition. FIG. 11 is a flowchart showing an example of a flow of a process executed by the first control device 170.

First, the state determiner 178 of the first control device 170 determines whether or not a condition is satisfied (step S100). Details of the condition will be described below. When the state determiner 178 determines that the condition is satisfied, the display controller 176 permits the rearview mirror display device 152 to display the service image IM2 (the user's image) (step S102). The permission is to display the service image IM2 on the rearview mirror display device 152 when the user U or the occupant intends to cause the rearview mirror display device 152 to display the service image IM2. The intention is a case where an instruction to display the service image IM2 on the rearview mirror display device 152 is given or a case where a mode for displaying the service image IM2 on the rearview mirror display device 152 is selected.

When the state determiner 178 determines that the condition is not satisfied, the display controller 176 restricts a process of causing the rearview mirror display device 152 to display the service image IM2 (the user's image) (step S104). The restriction is to prevent the rearview mirror display device 152 from displaying the service image IM2 or to restrict the display mode more than when the service image IM2 is permitted to be displayed. For example, a period of time in which the service image IM2 is displayed may be limited. For example, the display controller 176 may iterate a process of causing the rearview mirror display device 152 to display the rear image for a first prescribed period of time and then displaying the service image IM2 for a second prescribed period of time shorter than the first prescribed period of time. Thereby, the process of one routine in the present flowchart ends.

Conditions

FIG. 12 is a diagram showing an example of conditions. The condition is, for example, that the moving object M is stopped, that the shift position of the moving object M is a parking position, or that the moving object M is controlled according to driving assistance or automated driving (for example, driving assistance or automated driving in the first mode described above). For example, when the driver does not have a strong need to monitor the surroundings such as the rear, the condition is satisfied and the rearview mirror display device 152 is permitted to display the service image IM2.

Specific Example of Image Transition (Part 1)

FIG. 13 is a diagram showing an example of a relationship between the transition of images displayed on the rearview mirror display device 152 and a determination result of the state determiner. The first control device 170 causes the rearview mirror display device 152 to display the service image IM2 when the above-described condition is satisfied. When the above-described condition is no longer satisfied at time T+1, the first control device 170 causes the rearview mirror display device 152 to display a rearward image instead of the service image IM2. When the above-described condition is satisfied at time T+2, the first control device 170 causes the rearview mirror display device 152 to display the service image IM2 instead of the rearward image. A sound image is localized so that a sound can be heard from the backseat.

As described above, the first control device 170 changes the image displayed on the rearview mirror display device 152 in accordance with a state of the moving object, so that the occupant can visually recognize an image suitable for the state of the moving object. That is, the first control device 170 can improve an entertainment property and provide information suitable for the driver.

The above-described condition may be changed (for example, selectively changed). For example, the condition is that the moving object M is not stopped, that the shift position of the moving object M is a position where the moving object M can start (or which is not a parking position), that the moving object M is not controlled according to driving assistance or automated driving (for example, the driving assistance or the automated driving of the first mode described above) and the traveling of the moving object is controlled by the driver, or the like. The first control device 170 causes the display to display the service image when the moving object is moving, the shift position is a position where the moving object can start, or the traveling of the moving object is controlled by the driver's operation. By setting the condition in this way, the service image is provided when the moving object is moving or when the driver is controlling the moving object, so that the occupant can easily feel the presence of a person who is not located inside of the moving object. As a result, the first control device 170 can provide the occupant with the experience of traveling with a person who is not located inside of the vehicle.

Specific Example of Image Transition (Part 2)

FIG. 14 is a diagram showing another example of the relationship between the transition of images displayed on the rearview mirror display device 152 and the determination result of the state determiner. In the example of FIG. 14, the sound image localization control is changed in accordance with whether the condition is satisfied. The following description focuses on differences from the process described with reference to FIG. 13.

When the above-described condition is not satisfied at time T+1, the first control device 170 stops sound image localization so that the sound can be heard from the backseat and starts sound image localization so that the sound can be heard from the front passenger seat. When the above-described condition is satisfied at time T+2, the first control device 170 stops sound image localization so that the sound can be heard from the front passenger seat and starts sound image localization so that the sound can be heard from the backseat.

For example, when the above-described condition is not satisfied, a control process is performed so that the user U visually recognizes the scenery as if the user U sits in the front passenger seat and looks around using the second device 200. At this time, the sound is localized so that the driver in the driver's seat can hear a sound from the front passenger seat. When the above-described condition is satisfied, the image of the user U is displayed on the rearview mirror display device 152 as if the user U is sitting in the backseat. At this time, the sound is localized so that the driver in the driver's seat can hear the sound from the backseat. As described above, if the sound image is localized in accordance with a position where the user is virtually sitting, the occupant can feel the presence of the user U without discomfort, and the sense of presence is enhanced. Thereby, the entertainment property is further improved. In (Specific example of image transition (part 2)) as well, the condition may be changed (for example, selectively changed). For example, the condition is that the moving object M is not stopped, that the shift position of the moving object M is a position where the moving object M can start (or which is not a parking position), that the moving object M is not controlled according to driving assistance or automated driving (for example, the driving assistance or automated driving of the first mode described above) and the traveling of the moving object is controlled by the driver, or the like.

Although modes for carrying out the present invention have been described above using embodiments, the present invention is not limited to the embodiments and various modifications and substitutions can also be made without departing from the scope and spirit of the present invention.

What is claimed is:

1. An information processing device mounted in a moving object that an occupant boards, the information processing device comprising:
   a display device having a display configured to display a person image indicating a person or a character corresponding to the person and capable of adjusting a position of the display so that an occupant of a backseat is shown in a mirror when an occupant of a driver's seat or a front passenger seat of the moving object visually recognizes the display on the assumption that the display is the mirror and the occupant is sitting in the backseat of the moving object; and
   a control device configured to control a first speaker within the moving object so that a sound is output from a direction of the backseat when the display is allowed to display a service image including the person image in which the person or the character is sitting in the backseat of the moving object,
   wherein the first speaker outputs a sound by localizing a sound image so that the sound can be heard from the backseat to the occupant of the driver's seat or the front passenger seat,
   wherein the first speaker comprises a plurality of first sub-speakers arranged at positions different from each other, and
   wherein the control device localizes the sound image so that the sound can be heard from the backseat to the occupant of the driver's seat or the front passenger seat by adjusting at least one of volumes and phase differences of the plurality of first sub-speakers.

2. The information processing device according to claim 1, comprising a first communication device configured to communicate with a second communication device of a second device including the second communication device and a second microphone and used by a user at a location different from that of the moving object,
   wherein the sound is a sound acquired via the first communication device and uttered by the user into the second microphone.

3. The information processing device according to claim 2, wherein the person image is an image of the user using the second device or an image indicating a character corresponding to the user.

4. The information processing device according to claim 3, wherein the control device generates the service image by synthesizing the person image with an image in which the backseat is imaged and causes the display device to display the generated service image.

5. The information processing device according to claim 1, wherein the display of the display device is a rearview mirror provided for the occupant of the driver's seat to visually recognize the rear of the moving object and displays an image captured by an imager configured to image the rear.

6. The information processing device according to claim 5, wherein the rearview mirror is provided in front of the occupant of the driver's seat when the occupant of the driver's seat is sitting in the driver's seat of the moving object and is provided on a front windshield or ceiling of a cabin of the moving object.

7. The information processing device according to claim 1, wherein the control device causes the display device to display a service image including the person image when the moving object is not stopped.

8. An information processing device mounted in a moving object that an occupant boards, the information processing device comprising:
   a display device having a display configured to display a person image indicating a person or a character corresponding to the person and capable of adjusting a position of the display so that an occupant of a backseat is shown in a mirror when an occupant of a driver's seat or a front passenger seat of the moving object visually recognizes the display on the assumption that the display is the mirror and the occupant is sitting in the backseat of the moving object; and
   a control device configured to control a first speaker within the moving object so that a sound is output from a direction of the backseat when the display is allowed to display a service image including the person image in which the person or the character is sitting in the backseat of the moving object,
   wherein the control device
   causes the display to display a service image of first quality when the moving object is moving, and
   causes the display to display a service image of second quality higher than the first quality when the moving object is stopped.

9. An information processing device mounted in a moving object that an occupant boards, the information processing device comprising:
   a display device having a display configured to display a person image indicating a person or a character corresponding to the person and capable of adjusting a position of the display so that an occupant of a backseat is shown in a mirror when an occupant of a driver's seat or a front passenger seat of the moving object visually recognizes the display on the assumption that the display is the mirror and the occupant is sitting in the backseat of the moving object; and a control device configured to control a first speaker within the moving object so that a sound is output from a direction of the backseat when the display is allowed to display a service image including the person image in which the person or the character is sitting in the backseat of the moving object, wherein the control device permits the display device to display a service image including the person image when the moving object is not stopped, and causes an image captured by an imager for imaging a rear view from the moving object to be displayed without permitting the display device to display the service image including the person image when the moving object is stopped.

10. The information processing device according to claim 9, comprising a first communication device configured to communicate with a second communication device of a second device including the second communication device and a second microphone and used by a user at a location different from that of the moving object, wherein the sound is a sound acquired via the first communication device and uttered by the user into the second microphone, and wherein the control device causes the display device to display a service image including the person image when the moving object is not stopped and controls the first speaker so that the sound is output from a direction of the backseat or the driver's seat, and subsequently continuously controls the first speaker so that the sound is output when the moving object is stopped and causes the display device to display an image captured by the imager by stopping a process of causing the display device to display the service image including the person image.

11. An information processing device mounted in a moving object that an occupant boards, the information processing device comprising:

a display device having a display configured to display a person image indicating a person or a character corresponding to the person and capable of adjusting a position of the display so that an occupant of a backseat is shown in a mirror when an occupant of a driver's seat or a front passenger seat of the moving object visually recognizes the display on the assumption that the display is the mirror and the occupant is sitting in the backseat of the moving object; and a control device configured to control a first speaker within the moving object so that a sound is output from a direction of the backseat when the display is allowed to display a service image including the person image in which the person or the character is sitting in the backseat of the moving object, wherein the control device permits the display device to display a service image including the person image when a shift position of the moving object is not a parking position, and causes an image captured by an imager for imaging a rear view from the moving object to be displayed without permitting the display device to display the service image including the person image when the shift position of the moving object is the parking position.

12. The information processing device according to claim 11, comprising a first communication device configured to communicate with a second communication device of a second device including the second communication device and a second microphone and used by a user at a location different from that of the moving object, wherein the sound is a sound acquired via the first communication device and uttered by the user into the second microphone, and wherein the control device causes the display device to display a service image including the person image when the shift position of the moving object is a position where the moving object can start and controls the first speaker so that the sound is output from a direction of the backseat or the driver's seat, and subsequently continuously controls the first speaker so that the sound is output when the shift position of the moving object is changed from the position where the moving object can start to a parking position and causes the display device to display an image captured by the imager.

13. An information processing device mounted in a moving object that an occupant boards, the information processing device comprising:

a display device having a display configured to display a person image indicating a person or a character corresponding to the person and capable of adjusting a position of the display so that an occupant of a backseat is shown in a mirror when an occupant of a driver's seat or a front passenger seat of the moving object visually recognizes the display on the assumption that the display is the mirror and the occupant is sitting in the backseat of the moving object; and a control device configured to control a first speaker within the moving object so that a sound is output from a direction of the backseat when the display is allowed to display a service image including the person image in which the person or the character is sitting in the backseat of the moving object, wherein the control device permits the display device to display a service image including the person image when a moving object control device executes driving assistance or automated driving to control traveling of the moving object, and causes an image captured by an imager for imaging a rear view from the moving object to be displayed without permitting the display device to display the service image including the person image when a driver of the moving object performs an operation to control traveling of the moving object in a state in which the moving object control device does not execute the driving assistance or the automated driving.

14. The information processing device according to claim 13, comprising a first communication device configured to communicate with a second communication device of a second device including the second communication device and a second microphone and used by a user at a location different from that of the moving object, wherein the sound is a sound acquired via the first communication device and uttered by the user into the second microphone, and wherein the control device causes the display device to display a service image including the person image when the moving object control device executes the driving assistance or the automated driving to control traveling of the moving object and controls the first speaker so that the sound is output from a direction of the backseat or the driver's seat, and subsequently continuously controls the first speaker so that the sound is output when the driving assistance or the automated driving ends and the moving object is controlled according to an operation of the driver and causes the display device to display an image captured by the imager.

15. An information processing device mounted in a moving object that an occupant boards, the information processing device comprising:
a display device having a display configured to display a person image indicating a person or a character corresponding to the person and capable of adjusting a position of the display so that an occupant of a backseat is shown in a mirror when an occupant of a driver's seat or a front passenger seat of the moving object visually recognizes the display on the assumption that the display is the mirror and the occupant is sitting in the backseat of the moving object; and
a control device configured to control a first speaker within the moving object so that a sound is output from a direction of the backseat when the display is allowed to display a service image including the person image in which the person or the character is sitting in the backseat of the moving object,
wherein the moving object is a vehicle,
wherein the control device
controls the first speaker so that the display device is allowed to display a service image including the person image and the sound is output from a direction of the backseat when the vehicle does not satisfy a condition, and
controls the first speaker so that the sound is output from a direction of the front passenger seat without causing the display device to display the service image including the person image when the vehicle satisfies the condition, and
wherein the condition is that the vehicle is stopped, a shift position of the vehicle is a parking position, or the driver of the moving object performs an operation to control traveling of the moving object without executing driving assistance or automated driving.

16. An information processing system comprising:
an information processing device mounted in a moving object that an occupant boards; and
a user device,
wherein the information processing device comprises:
a display device having a display configured to display a person image indicating a person or a character corresponding to the person and capable of adjusting a position of the display so that an occupant of a backseat is shown in a mirror when an occupant of a driver's seat or a front passenger seat of the moving object visually recognizes the display on the assumption that the display is the mirror and the occupant is sitting in the backseat of the moving object;
a control device configured to control a first speaker within the moving object so that a sound is output from a direction of the backseat when the display is allowed to display a service image including the person image in which the person or the character is sitting in the backseat of the moving object; and
a first communication device configured to communicate with a second communication device of a second device including the second communication device and a second microphone and used by a user at a location different from that of the moving object,
wherein the sound is a sound acquired via the first communication device and uttered by the user into the second microphone, and
wherein the user device comprises:
the second communication device configured to communicate with the first communication device;
the second microphone configured to collect a sound uttered by the user,
wherein the second communication device transmits the sound collected by the second microphone to the first communication device;
a detection device configured to detect an oriented direction of the user:
a camera having one or more cameras including at least an indoor camera provided on a prescribed seat of the moving object and configured to image an inside of the moving object seen from the prescribed seat; and
a display device configured to display an image corresponding to the oriented direction seen from the prescribed seat of the moving object among images captured by the camera.

17. The information processing system according to claim 16,
wherein the second communication device transmits information of the oriented direction to the first communication device,
wherein the control device controls the first communication device so that an image corresponding to the oriented direction acquired via the first communication device among the images captured by the camera is selectively transmitted to the second communication device, and
wherein a display device of the user device displays an image corresponding to the oriented direction seen from the prescribed seat acquired via the second communication device.

18. The information processing system according to claim 16,
wherein the first communication device transmits images captured by the camera to the second communication device, and
wherein the user device causes the display device to selectively display an image corresponding to the oriented direction among the images captured by the camera.

19. The information processing system according to claim 16,
wherein the information processing device further comprises a first microphone configured to collect a sound uttered by at least the occupant,
wherein the user device further comprises a second speaker configured to output a sound uttered by the occupant acquired via the second communication device, and
wherein the first communication device transmits the sound collected by the first microphone to the second communication device.

* * * * *